United States Patent
Zhou et al.

(10) Patent No.: US 11,250,716 B2
(45) Date of Patent: Feb. 15, 2022

(54) NETWORK SYSTEM FOR CONTEXTUAL COURSE RECOMMENDATION BASED ON THIRD-PARTY CONTENT

(71) Applicant: Microsoft Technology Licensing, LLC, Redmond, WA (US)

(72) Inventors: Yi Qun Zhou, Mountain View, CA (US); Yayuan Hu, Sunnyvale, CA (US); Haowen Cao, Sunnyvale, CA (US); Ibraheem Abdul Malik, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 16/118,218

(22) Filed: Aug. 30, 2018

(65) Prior Publication Data

US 2020/0074871 A1 Mar. 5, 2020

(51) Int. Cl.
*G09B 5/12* (2006.01)
*G06N 20/00* (2019.01)
*G06F 16/48* (2019.01)
*G06F 16/9535* (2019.01)

(52) U.S. Cl.
CPC .............. *G09B 5/12* (2013.01); *G06F 16/48* (2019.01); *G06F 16/9535* (2019.01); *G06N 20/00* (2019.01)

(58) Field of Classification Search
None
See application file for complete search history.

(56) References Cited

U.S. PATENT DOCUMENTS

| 6,292,792 | B1 * | 9/2001 | Baffes | G06N 5/022 |
| | | | | 706/45 |
| 2013/0066973 | A1 * | 3/2013 | Macadaan | H04L 67/306 |
| | | | | 709/204 |
| 2015/0325133 | A1 * | 11/2015 | Gaglani | G09B 7/00 |
| | | | | 434/322 |

\* cited by examiner

*Primary Examiner* — Bruk A Gebremichael
(74) *Attorney, Agent, or Firm* — NDWE, LLP.

(57) ABSTRACT

Techniques are provided for identifying and presenting contextual course recommendations. A browser extension analyzes text within web content that is being displayed on a computing device. The browser extension, as part of the analysis, identifies one or more keywords. The browser extension transmits the one or more keywords over a computer network to a remote computer system. For each keyword, the remote computer system identifies one or more courses and one or more relevance scores, each of which reflects a relevance measure between the keyword and a course of the one or more courses. The remote system transmits, to the browser extension, course identification data that identifies one or more particular courses. The browser extension causes the course identification data to be displayed on the computing device.

19 Claims, 4 Drawing Sheets

FIG. 3

NETWORK SYSTEM FOR CONTEXTUAL COURSE RECOMMENDATION BASED ON THIRD-PARTY CONTENT

TECHNICAL FIELD

The present disclosure relates to multi-entity cross network communication and, more particularly to, a network system for generating course recommendations based on content from third-party sources.

BACKGROUND

Providing relevant content recommendations to users that visit a website is a challenge for a provider of that website. One approach is for a content provider to identify potentially relevant content recommendations based on past online behavior relative to the website. There are at least two problems with this approach. First, users must be on the website in order to receive the content recommendations. Therefore, if a user does not return to the website, then the user will not receive the content recommendations. Even if the user does return to the website, the content recommendations might not be of interest any more to the user. Second, the content recommendations are only based on online activity with respect to the website. Thus, the content recommendations are less likely to be relevant to the user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a screenshot of an example web browser display that includes web content from a third-party content provider and identification data from a learning content distribution system, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for identifying relevant learning content for a user while the user is visiting third-party websites are provided. A user's web browser (executing on a computing device) includes an extension that analyzes text on a web page for potentially relevant keywords and sends those keywords over a computer network to a learning content distribution system. That computer system uses the keywords to identify one or more learning content items that may be relevant to the content that the user is currently viewing. The computer system sends data that identifies the learning content to the extension, which causes the data to be displayed on a screen of the computing device.

Embodiments described herein improve computer technology by presenting potentially relevant learning content (typically only available by visiting a learning platform) while the corresponding user is visiting different third-party websites. Many of such users are looking for learning content even though they might not be currently visiting a website of the learning platform. Embodiments even target users who are not proactively looking for learning content, but whose online behavior is indicative of being curious about certain learning content. Embodiments intelligently learn how often or when to present data about potentially relevant learning content while a user is visiting a third-party website. Embodiments increase online engagement with the learning platform.

A "keyword" is a set of one or more words that are extracted from web content. A browser extension may identify multiple keywords in a single web page or instance of web content.

"Learning content" is content that is created for the purpose of teaching one or more concepts, principles, and/or skills. "Learning content" comprises one or more learning content items, each of which corresponds to a single video item, a single audio item, or a single course that comprises multiple video items or audio items that share a particular theme, such as a course on machine learning, on programming in Python, on investing in the stock market, or on learning a new language.

System Overview

Figure 1:
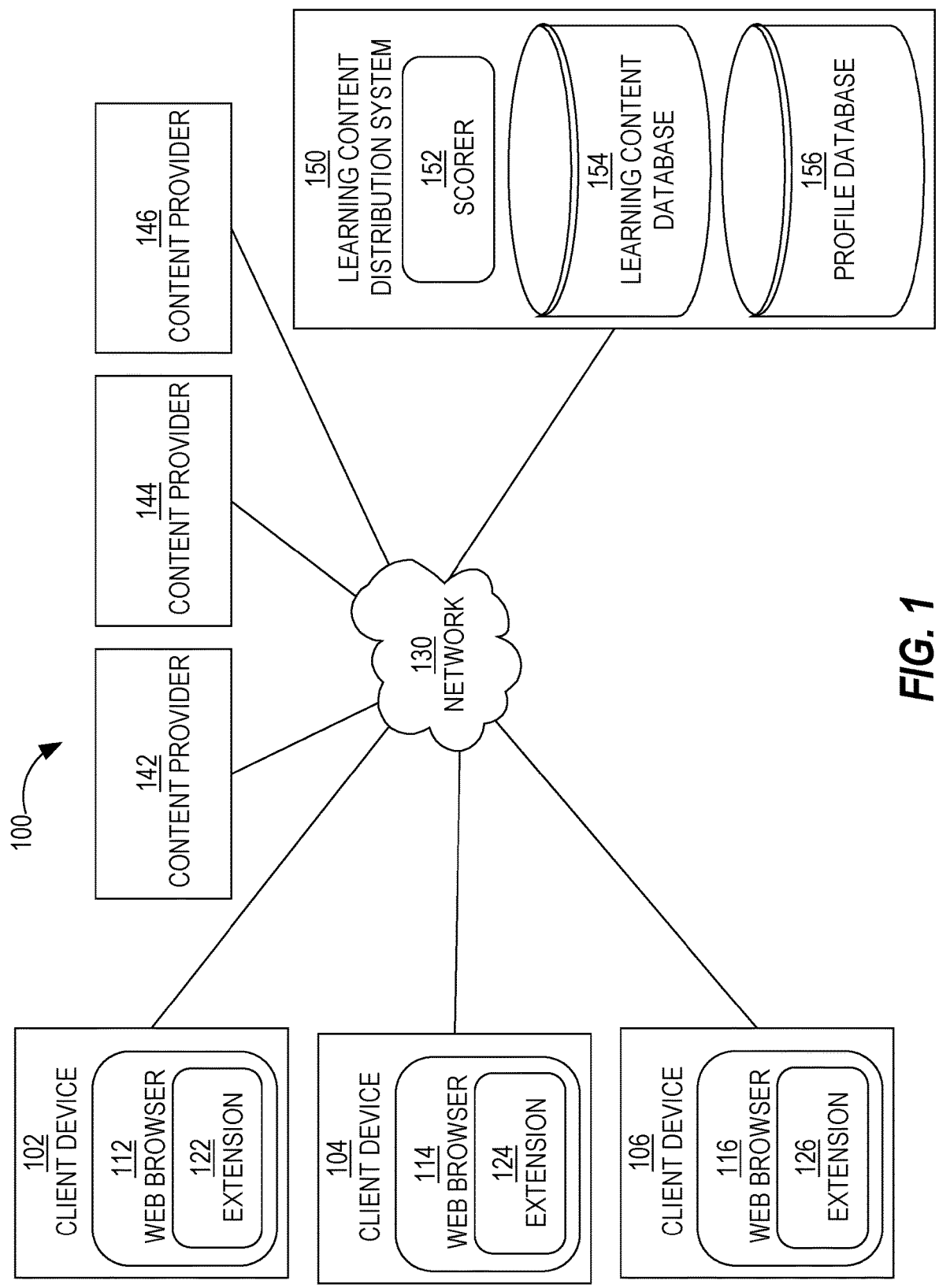
FIG. 1 is a block diagram that depicts an example network system for generating contextual learning content recommendations based on third-party content, in an embodiment.

FIG. 1 is a block diagram that depicts an example network system 100 for generating contextual learning content recommendations based on third-party content, in an embodiment. Network system 100 includes multiple client devices 102-106, a network 130, content providers 142-146, and learning content distribution system 150. Although only three client devices are depicted, network system 100 may include many client devices.

Each of client devices 102-106 is owned and operated by a different user. Examples of client devices 102-106 include desktop computers, laptop computers, tablet computers, wearable devices, video game consoles, and smartphones. Each of client devices 102-106 includes a web browser that executes thereon. Examples of web browsers include Internet Explorer, Chrome, and Mozilla. Although only one browser per client device is depicted, a client device may have multiple web browsers installed and executing thereon. Each of web browsers 112-116 includes a learning content extension (LCE). Each of LCEs 122-126 communicates with learning content distribution system 150 over one or more computer networks, such as network 130.

Similarly, although only three content providers are depicted, network system 100 may include many content providers. Examples of content providers 142-146 include web sites of any type, such as news web sites (e.g., cnn-.com), entertainment websites, sports web sites (e.g., espn-.com), financial websites (such as websites that allow users to view financial activity and buy and sell securities), encyclopedia websites (e.g., Wikipedia), search engine websites (e.g., bing.com, google.com, yahoo.com), and social networking websites (e.g., LinkedIn.com, facebook.com). Each of content providers 142-146 may be owned and operated by a different entity relative to other entities that own/operate the other content providers. Each of content providers 142-146 is communicatively coupled to one or more of client devices 102-106 through one or more computer networks, such as network 130.

Network 130 may be implemented on any medium or mechanism that provides for the exchange of data between clients 102-106 and learning content distribution system 150 and between clients 102-106 and content providers 142-146. Examples of network 130 include, without limitation, a network such as a Local Area Network (LAN), Wide Area Network (WAN), Ethernet or the Internet, or one or more terrestrial, satellite or wireless links.

Learning content distribution system 150 is communicatively coupled to client devices 102-106 through one or more computer networks, such as network 130. Although depicted as a single entity, learning content distribution system 150 may be implemented on multiple computing devices that are communicatively coupled to each other and that may be geographically remote relative to each other or implemented on a single LAN or a single data center.

Learning content distribution system 150 includes a scorer 152, a learning content database 154, and (optionally) a profile database 156. Learning content database 154 stores multiple learning content items. Each learning content item is associated with a record containing metadata about the learning content item, such as a name of the learning content item, an author or creator of the learning content item, a name of a content provider of the learning content item, a date when the learning content item was uploaded to learning content distribution system 150, a length of the learning content item (e.g., playback time in in hours, minutes, and/or seconds), one or more headings (e.g., chapter headings, section headings, sub-section headings within a transcript of the learning content item), one or more skills that the learning content item teaches, one or more skills that are pre-requisites to have prior to consuming (e.g., viewing or listening to) the learning content item, and one or more keywords or topics associated with the learning content item. Some learning content items stored in learning content database 154 may be organic; that is, such items are from the same entity that owns or operates learning content distribution system 150. Other learning content items may originate from third-party entities or providers. The providers of learning content items may be different from any of content providers 142-146.

Although learning content distribution system 150 is depicted as including profile database 156, learning content distribution system 150 may instead have access to profile database 156. Profile database 156 stores multiple user profiles. Each user profile corresponds to a different user that has registered with an online service (e.g., LinkedIn) that is affiliated or associated with learning content distribution system 150. Example data items within a user profile include first name, last name, employment status, job title, one or more skills, industry, seniority level, years of experience, current employer(s), past employer(s), work summary, job summaries, number of connections/"friends", and identities of those connections.

Learning content distribution system 150 receives data (e.g., keywords) from client devices 102-106 and scorer 152 (1) identifies, from learning content database 154, zero or more learning content items based on the data and (2) sends any identified learning content items to the appropriate client device. Scorer 152 may be implemented in software, hardware, or any combination of software and hardware.

Learning content distribution system 150 is not affiliated with content providers 142-146; thus, each of content providers 142-146 is considered a third-party relative to learning content distribution system 150.

Process Overview

Figure 2:
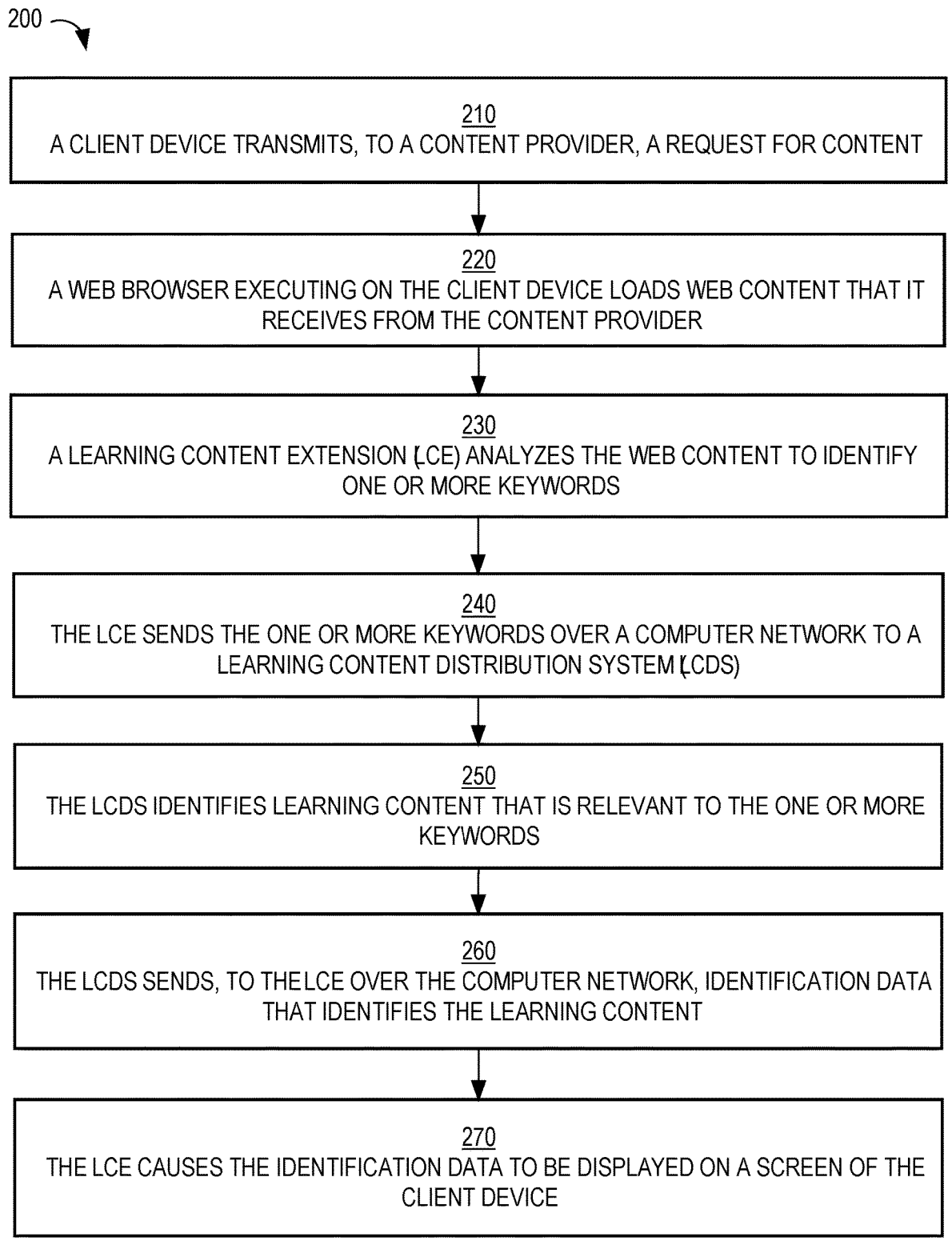
FIG. 2 is a flow diagram that depicts a process for generating learning content recommendations based on third-party content, in an embodiment.

FIG. 2 is a flow diagram that depicts a process 200 for generating learning content recommendations based on third-party content, in an embodiment. Thus, the learning content recommendations are contextual, or based on the current data that is being presented to (or at least requested by) the corresponding user. Process 200 is implemented by different components or elements of network system 100.

At block 210, a client device (e.g., client device 102) transmits a request for content to a content provider (e.g., content provider 142). Block 210 may be performed in response to a user, interfacing with a web browser (e.g., web browser 112), selecting a link, in a web page, that is associated with the content provider. Alternatively, block 210 may be performed in response to a user entering, into a text field of the web browser, a uniform resource locator (URL) or domain name that is associated with the content provider.

At block 220, the web browser loads web content that it receives from the content provider. Block 220 may involve processing the web content to generate and render a web page that the web browser displays on a screen of the client device.

At block 230, a learning content extension (e.g., LCE 122) performs textual analysis on at least a portion of the web content to identify one or more keywords in the web content. Keyword extraction is tasked with the automatic identification of terms that best describe the subject of a document. Keyword extraction may comprise three parts: candidate selection, properties calculation, and scoring and selecting keywords. In candidate selection, all possible words, phrases, terms or concepts that can potentially be keywords are extracted. In properties calculation, for each candidate, properties that indicate that the candidate may be a keyword are calculated. For example, a candidate appearing in the title of a book (or in a chapter heading) is a likely keyword. In scoring and selecting keywords, all candidates are scored by either combining the properties into a formula, or using a machine learning technique to determine probability of a candidate being a keyword. A score or probability threshold, or a limit on the number of keywords is then used to select the final set of keywords. Examples of an implementation of keyword extraction includes Rapid Automatic Keyword Extraction (RAKE), tf-idf, and TextRank. Tf-idf (or term frequency-inverse document frequency) is a numerical statistic that reflects how important a word is to a document in a collection or corpus. Other natural language processing (NLP) algorithms may be used to extract keywords, which can be frequency-based bigrams, trigrams, or other forms depending on the algorithm.

Block 230 may first involve removing (e.g., HTML and/or XML) tags and removing stops words and punctuation.

An example output of block 230 relative to a web page about Bitcoin is the following:
 (10.0, 'users directly without')
 (9.0, 'worldwide payment system 93')
 (9.0, 'wall street journal19')
 (9.0, 'payment14 research produced')

(9.0, 'name satoshi nakamotoll')
(8.75, 'vendors accepted bitcoin')
(8.5, 'convention followed throughout')
(8.0, 'transactions take place')
(5.0, 'white paper6')
(4.75, 'lowercase bitcoin')
(4.75, 'blockchain bitcoin')
(4.75, 'bitcoin lowercase')
(4.75, 'bitcoin capitalization')

The output of block 230 represents a summary of the corresponding webpage based on all the words that are mined.

At block 240, the learning content extension sends the identified one or more keywords over network 130 to learning content distribution system 150. Block 240 may involve the learning content extension generating a (e.g., HTTP) message that includes the one or more keywords, a source address (identifying the client device), and a destination address (identifying learning content distribution system 150).

At block 250, learning content distribution system 150 identifies, based on the one or more keywords, learning content that is relevant to the one or more keywords. As noted previously, learning content comprises one or more learning content items. Thus, more than one learning content item may be identified.

At block 260, learning content distribution system 150 sends, to the learning content extension over network 130, identification data that identifies the learning content. Block 260 may involve learning content distribution system 150 generating a (e.g., HTTP) message that includes the identification data, a source address (identifying learning content distribution system 150), and a destination address (identifying the client device).

Figure 3:
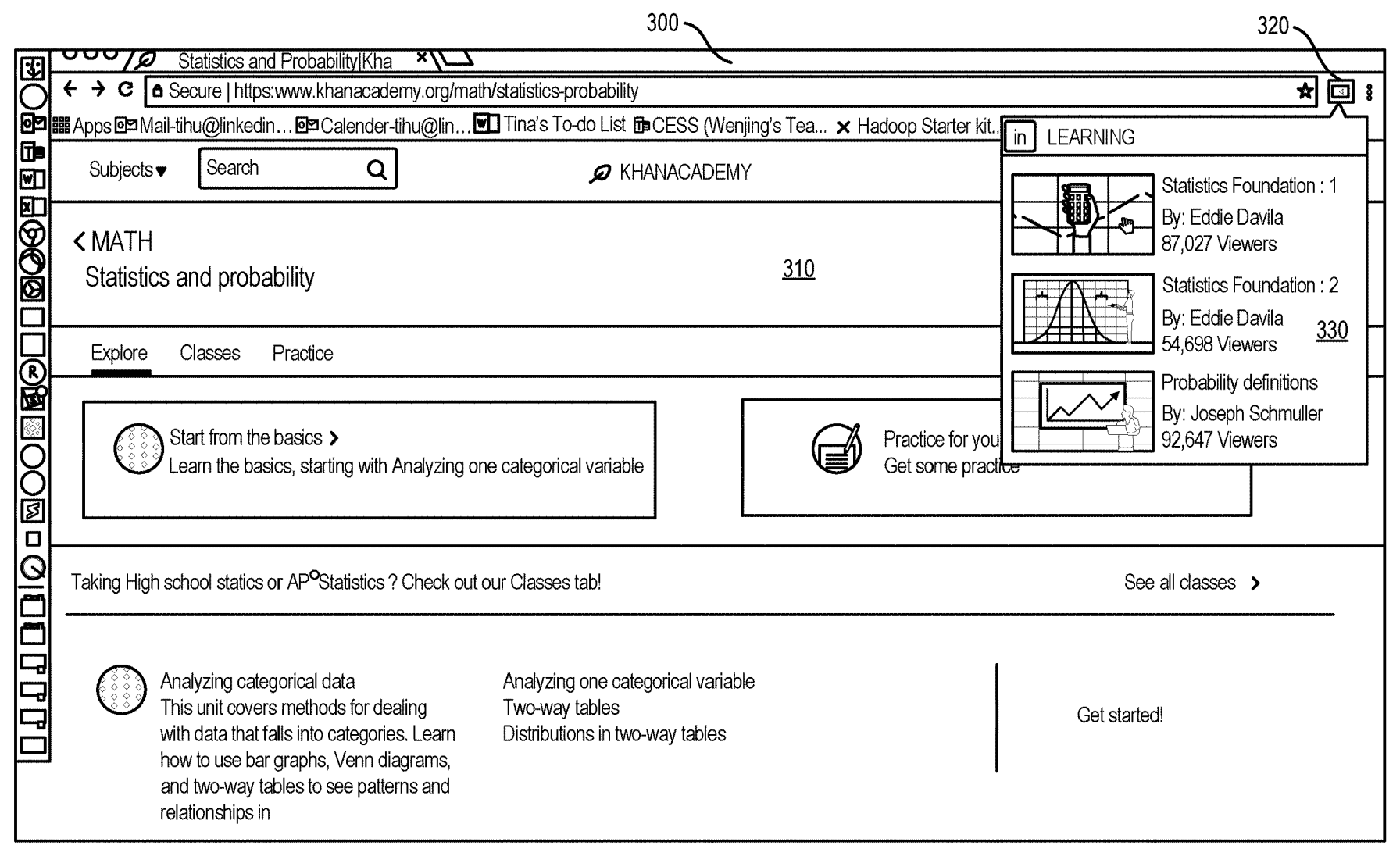

At block 270, the learning content extension causes the identification data to be displayed on a screen of the client device. The identification data may be displayed in a popup display overlaying the web browser. FIG. 3 is a screenshot of an example web browser display 300 that includes web content 310 from a third-party content provider and identification data 330 (from learning content distribution system 150) that is displayed (or caused to be displayed) by a learning content extension, in an embodiment. In this example, identification data 330 identifies multiple learning content items. Each learning content item represents a different recommendation to the user of the web browser. In this example, identification data 330 is displayed over a portion of web content 310. (Identification data 330 may be displayed automatically, without requiring user input, or may be displayed in response to the user selecting icon 320.) In an alternative embodiment, selecting icon 320 causes (a) a new tab in the web browser to be opened, the new tab including identification data 330 or (b) a new window of the web browser to be opened, the new window including identification data 330.

If the user selects a learning content item, then the user will be able to consume (e.g., watch or listen to) the learning content item, either immediately, in the current (e.g., popup) display, or in another tab or window of the web browser. The web browser may transmit a (e.g., HTTP) request that contains a URL that is associated with the learning content item. The URL may include an identifier for the selected learning content item and may reference learning content distribution system 150 or another computer system that is affiliated with learning content distribution system 150. Whichever computer system receives the request, the content that the web browser receives from that computer system is displayed in the popup window of the learning content extension or in another tab or window of the web browser.

In a related embodiment, learning content distribution system 150 stores the identification data in association with an account of the user or client device. Later, when the client device of the user operating the same or different client device visits a website associated with learning content distribution system 150, account information of the user/client device, including the identification data, is presented to the user. This related embodiment may be performed in addition to blocks 260-270 or in place thereof. Thus, even if blocks 260-270 are performed, the user may be presented with the identification data when visiting the website to remind the user about the recommendations.

In a related embodiment, after block 270, the user provides input, through the learning content extension, that indicates that s/he is not interested in one or more of the identified learning content items. (Each learning content item may be associated with one or more graphical elements, one of which indicates that the user is not interested in the corresponding learning content item.) This input indicates that the user might be interested in any non-selected learning content items. Additionally or alternatively, the user provides input, through the learning content extension, that s/he is interested in one or more of the identified learning content items. Whichever learning content items that the user indicates s/he at least might be interested in later, the learning content extension sends identification data of those learning content item(s) is to learning content distribution system 150 for persistent storage and later presentation to the user when the user visits the website.

Mode

In an embodiment, a learning content extension operates in different modes at different times. For example, if a user is logged into learning content distribution system 150 (or an affiliated computer system), then the corresponding learning content extension operates in a first mode; if the user is not logged in, then the learning content extension operates in a second mode. A user is "logged in" if the learning content distribution system 150 verifies credential data (or "credential cookie") that learning content extension retrieves from the cache of the corresponding web browser. The credential data may be a cookie that learning content distribution system 150 sets or establishes upon verifying the user's credentials (e.g., a user name and password). In a related embodiment, a learning content extension presents a user interface to allow the user to provide his/her credentials.

While in the first mode, learning content distribution system 150 may store identification data of one or more learning content items in an account associated with the corresponding user so that the identification data may be presented to the user later when visiting a website associated with learning content distribution system 150.

While in the first mode, the learning content extension may allow one or more actions that are not allowed in the second mode, such as the ability to indicate interest in individual learning content items or the ability to view any of the recommended learning content.

In a related embodiment, a learning content extension operates in a subscriber mode and a non-subscriber mode, which may be similar to the not logged in mode or the logged in mode. Thus, a user may be a member of a computer system (e.g., a professional social networking system) affiliated with learning content distribution system

150, but might not be a subscriber of learning content distribution system 150 itself.

Different learning content extension modes dictate the types of actions or the type of access that a user has with respect to learning content. For example, in subscriber mode, a learning content extension allows a user to consume a learning content item immediately (e.g., in a popup window that the learning content extension generates or in another tab or window of the corresponding web browser). However, in non-subscriber mode, the learning content extension allows a user to consume only a small portion (e.g., the first three minutes) of the learning content item (or none at all) and, optionally, invites the user to subscribe in order to consume the entirety of the learning content item. An invitation to subscribe may include a link that, if selected by the user, causes a (e.g., HTTP) request that references learning content distribution system 150 (or affiliated computer system) to be generated and a response to the request to be displayed (e.g., in another tab or window to be opened up in the corresponding web browser). The response may comprise web content that describes the benefits and any cost of subscribing to receiving learning content from learning content distribution system 150.

As another example, in non-subscriber mode, a user may be given temporary access to consuming a limited number of learning content items before the corresponding learning content extension enters a mode that restricts all (or most) access to any subsequent learning content items.

Interacting with Learning Content

In an embodiment, a learning content extension provides a user interface that allows a user to interact with learning content in one or more ways. Examples of types of interactions allowed by a learning content extension include selecting input that indicates that (1) the user wants to consume a learning content item immediately, (2) the user wants to consume a learning content item later, (3) the user is not interested in a learning content item, or (4) a learning content item is not relevant to the user. If multiple learning content items are presented to a user simultaneously, then the user may provide one type of input (e.g., consume later) relative to one learning content item and another type of input (e.g., not interested) relative to another learning content item.

In a related embodiment, a learning content extension provides a user interface that allows a user to provide single input that pertains to multiple learning content items. For example, a display of learning content may include a graphical element that, when selected, causes multiple learning content items to be saved in association with an online learning account of the user so that the user may consume the learning content items later. As another example, a display of learning content may include a graphical element that, when selected, causes multiple learning content items to be ignored and removed from display.

A learning content extension or learning content distribution system 150 keeps a log of these interactions. For example, a learning content extension determines a type of interaction (e.g., one of the four interactions described above) and creates a record of the interaction. The record may include a learning content item (LCI) identifier for each LCI interacted with, an interaction type identifier that identifies the type of interaction, and, optionally, a timestamp of the interaction. The learning content extension may store the record locally or transmit the record to learning content distribution system 150 for storing in association with an online account of the corresponding user.

Communication Channels

In an embodiment, learning content that learning content distribution system 150 identifies based on one or more keywords from a learning content extension is presented to a user of the corresponding client device via one or more communication channels other than through the learning content extension. For example, learning content distribution system 150, after identifying learning content based on one or more keywords, determines an email address that is associated with a user identifier that accompanies the message, from the learning content extension, that includes the one or more keywords. Learning content distribution system 150 has access to user account data that includes the email address. Learning content distribution system 150 causes an email message to be generated that is addressed to the email address, causes identification data of the learning content to be included in the email message, and causes the email message to be transmitted to the intended recipient.

As another example, learning content distribution system 150, after identifying learning content based on one or more keywords from a learning content extension, stores the learning content in an online account to which learning content distribution system 150 has access. The online account is associated with the user of the client device that transmitted the keyword(s) to learning content distribution system 150. Later, when the user operates the client device (or another client device) to access the online account (whether through learning content distribution system 150 or another computer system), the learning content is automatically presented to the user on a screen of that client device.

Throttling Recommendations

In an embodiment, a learning content extension throttles one or more actions. Examples of actions that a learning content extension might throttle include analyzing web content that a web browser recently received, sending identified keywords to learning content distribution system 150, and displaying learning content via the corresponding web browser.

A learning content extension might throttle for different reasons. For example, the learning content extension detects that the corresponding user has not selected any learning content item the last N times the learning content extension displayed learning content. As another example, the learning content extension detects that the corresponding user has selected an "Ignore" button (or another graphical element, such as a "Close" popup element) the last M times the learning content extension displayed learning content. Throttling decisions may be based on interaction records that the learning content extension created previously.

In a related embodiment, learning content distribution system 150 makes throttling decisions with respect to a particular user and learning content extension. Such decisions may be made based on interaction records that learning content distribution system 150 received from the learning content extension and that learning content distribution system 150 stored in association with the particular user. For example, if learning content distribution system 150 determines that the particular user has provided negative feedback with respect to the last M sets of learning content, then learning content distribution system 150 determines to throttle future learning content.

"Throttling" may include: (1) preventing any future identified learning content from being displayed to a particular user, (2) preventing future identified learning content from being displayed to a particular user for a period of time (e.g., a week or a month), (3) preventing future identified learning content from being displayed to a particular user for the next N visits to different third-party content providers, or (4) reducing the chances that learning content is presented in the future. For example, learning content distribution system 150 (or the corresponding learning content extension) increases a threshold score that a learning content item must exceed in order to be presented to a particular user. For example, a threshold score that a learning content item must have is 50 in order to be presented to a user via a learning content extension of the user. After one or more negative inputs from the user through the learning content extension, the threshold score is increased to 75. Thus, different users may be associated with different threshold scores. As another example, a new threshold score for a user may be based on the highest score of a learning content whose identity was presented to the user. For example, if the highest score of such a learning content item is 65, then the new threshold score is at least 65 or some value higher than 65 (e.g., 10% higher than the highest previous score).

Relevance

Learning content distribution system 150 performs one or more searches based on each request from a learning content extension. A request from a learning content extension includes one or more keywords. If a request includes multiple keywords, then learning content distribution system 150 may perform a single search that involves identifying learning content items that are associated with one or more of the keywords. The more keywords with which a learning content item is associated, the higher the relevance of the learning content item. Conversely, the fewer the keywords with which a learning content item is associated, the lower the relevance of the learning content item. Thus, generally, learning content items that are associated with more keywords will be scored or ranked higher than learning content items that are associated with fewer keywords.

Alternatively, learning content distribution system 150 performs multiple searches, one for each keyword and/or combination of keywords. The result of each search may be combined to generate a single result where the learning content items identified in each separate search result is ranked relative to each other.

In an embodiment, a relevance score of a learning content item based on a keyword depends on how the learning content item is associated with the keyword. For example, if a keyword is found in a title of a learning content item, then the learning content item will have a relatively high relevance score. If a keyword is found in a short description of abstract of the learning content item, then the learning content item will have a high, but relatively lower, relevance score. If a keyword is found in a chapter heading of a learning content item, then the learning content item will have a relatively high relevance score, perhaps higher than if the keyword was found in an abstract of the learning content item. If a keyword is found only in non-heading and non-title text of the learning content item, then the learning content item will have the lowest relevance score given that keyword.

In a related embodiment, a relevance score of a learning content item based on a keyword depends on how often the keyword appears in a transcript of the learning content item. Thus, generally, the greater the number of instances of the keyword in a transcript of a learning content item, the higher the relevance score. Conversely, the fewer the number of instances of the keyword in a transcript of a learning content item, the lower the relevance score.

In an embodiment, an audio or video learning content item is associated with a transcript of the audio found in the learning content item. The transcript may be provided by the provider of the learning content item. Alternatively, the transcript may be automatically generated using speech-to-text computer technology. Either way, the transcript may be modified to include additional text or tags that indicate a title, chapter headings, sub-headings, section headings, etc., to break up the transcript so that it is more readable. Such a transcript may be leveraged by a relevance scoring component of learning content distribution system 150 to generate relevance scores for learning content items based on associated keywords.

In an embodiment, a relevance score of a learning content item depends on whether the learning content item has been presented to the user previously. For example, if a learning content item has been recommended to the user more than N number of times in the past and the user did not select it, then the learning content item is given a lower relevance score. Where the user has been presented a learning content item as a recommendation may dictate how much (if any) the relevance score of the learning content item should decrease. For example, if a learning content item was previously recommended on a website affiliated with learning content distribution system 150 and the user did not select that recommendation, then the relevance score decreases X amount; whereas if the learning content item was previously recommended to the user via a learning content extension and the user did not select that recommendation, then the relevance score decreases Y amount that is greater than the X amount.

In a related embodiment, the further in the past that a learning content item has been recommended to a user, the less effect (if any) that recommendation has on a current relevance score of the learning content item.

User Profile Data

In an embodiment, learning content distribution system 150 identifies one or more attributes of a user (e.g., from user profile database 156) when determining which learning content items to present to the user based on one or more keywords. For example, learning content items that are associated with one or more keywords (from a learning content extension) are identified and then one or more attributes of the corresponding user are used to score or re-rank the identified learning content items. Such attributes may be stored in a profile (of the user) to which learning content distribution system 150 has access. Example attributes include employment status, job title, one or more skills, industry, seniority level, years of experience, current employer(s), past employer(s), work summary, job summaries, number of connections/"friends", and identities of those connections.

For example, if one or more connections of a user has viewed a learning content item and learning content distribution system 150 identifies that learning content item as a candidate as a result of a search based on a keyword transmitted from a learning content extension of the user, then a score for the learning content item is greater than it would otherwise have been if no connection of the user has viewed the learning content item. As a similar example, if multiple co-workers at a user's current employer have viewed a learning content item, then the user might be more likely to view the same learning content item than a user who does not have such co-workers.

As another example, learning content distribution system 150 determines that a particular learning content item has a relatively high user selection rate among users with a particular job title. If a particular user has that particular job title listed in a profile of the particular user and learning content distribution system 150 identifies the particular learning content item in response to one or more keywords from a learning content extension of the particular user, then that particular learning content item may receive a higher relevance score and, thus, be more likely to be presented to the particular user.

As another example, if (1) a learning content item is associated with a skill that a user does not currently have but that is related to one or more skills that are listed in the user's profile and (2) learning content distribution system 150 identifies that learning content item as a candidate as a result of a search based on a keyword transmitted from a learning content extension of the user, then a score for the learning content item is greater than it would otherwise have been if (a) learning content item is associated with only with skills that are currently listed in the user's profile or (b) the learning content item is not associated with a skill that is related to any of the skills listed in the user's profile.

Search Results of Multiple Keywords

In an embodiment, learning content distribution system 150 uses multiple keywords from a learning content extension in identifying relevant learning content. For example, a learning content item may only be identified if the learning content item appears in the top ten in at least two different search results, each corresponding to a different keyword. This may ensure that what learning content distribution system 150 identifies is very relevant.

Weighting Different Portions of Web Content

In an embodiment, different keywords that are extracted from web content (e.g. a web page) may be weighted differently. Different weights may cause some lower ranked learning content items to be ranked higher than previously higher ranked learning content items that are associated with relatively lower weights. Different portions of web content may be associated with different weights. For example, a keyword that is extracted from a title of web content may have a higher weight than a keyword from the main body of the web content.

HTML tags may be used to determine what weight (if any) to apply to each keyword. For example, keywords that are extracted within a title portion (e.g., found between 'title' tags) may be associated with the highest weight, keywords that are extracted from a header portion (e.g., found between 'header' tags) may be associated with the next highest weight, and keywords that are extracted from a body portion may be associated with the lowest weight (or no weight).

Search terms may also be used as a keyword. For example, a learning content extension identifies a set of one or more search terms in a search field of a search engine page as a keyword and sends the keyword to learning content distribution system 150.

Topics on web pages of certain web sites may also be used as keywords. For example, a user visits a Wikipedia page on the Python programming language. As a result, the corresponding learning content extension identifies "Python" as a keyword. The keyword may be extracted from the URL or from a certain (e.g., pre-defined) portion within the web page.

Weighting Different Sources of Web Content

In an embodiment, a (e.g., web) source from which one or more keywords are extracted dictates a weighting of those keywords. For example, sources that are associated with learning (e.g., Wikipedia, search engine results page, another learning platform that hosts learning content) make it more likely that users visiting those sources are interested in learning. In contrast, when users are visiting other types of sources, such as entertainment or sports websites, then such users are presumed to be less likely interested in recommended learning content. A source weighting may be used to adjust a relevance score so that a learning content item is more likely to be recommended if the source is associated with learning than if the source is not associated with learning.

A source weighting may be determined manually or automatically. For example, prior to any user installing a learning content extension, a developer or administrator of the learning content extension assigns a source weighting to each source of multiple sources. The sources may be identified based on popularity, such as unique web traffic to the source.

A learning content extension may include a source weighting mapping that associates sources with source weightings. The learning content extension looks up a source weighting in the mapping based on an identity of the source (e.g., a URL) and passes the source weighting to learning content distribution system 150. In this way, the identity of the source (e.g., a website) is not passed to learning content distribution system 150.

Alternatively, learning content distribution system 150 includes a source weighting mapping and applies the mapping when calculating a score for one or more learning content items in response to receiving an identity of the source from the corresponding learning content extension.

In a related embodiment, a learning content extension stores a source-category mapping that maps a source to a category and transmits only category data to learning content distribution system 150. Example categories include learning, non-learning, entertainment, internet search, sports, news, computer technology, and commerce. A source (or a particular web page) may be associated with multiple categories. In this embodiment, learning content distribution system 150 stores a category weighting mapping that maps different categories to different weights. In this way, the identity of the source is not passed to learning content distribution system 150. Also, if weights are changed, only changes to learning content distribution system 150 are needed and no already-deployed learning content extension needs to be updated.

In a related embodiment, if a user is visiting a website that is classified as a learning source, then the learning content extension presents any recommended learning content immediately. Conversely, if a user is visiting a website that is classified as another type of source (e.g., a non-learning source), then learning content extension does not present any identified learning content. Instead, any such identified learning content is stored in associated with an online account of the user and the user is presented with the identified learning content when the user visits a website that has access to the online account.

In an embodiment, a learning content extension leverages the source information of each search result on a search results page generated by a search engine and uses the source information to weight (or at least categorize) different keywords. For example, a search results page includes two search results: a first search result identifying a first source (or website) and a second search result identifying a second source. The first source may be classified as a learning source and the second source as a sports website. Any keyword extracted from the first search result may be weighted higher than any keyword extracted from the second search result. Additionally, a weight for a keyword may be even higher if a majority or a certain percentage (e.g., more than 65%) of the search results on a search results page are from sources that are classified as learning sources.

Confidence Level

In an embodiment, a confidence level may be determined and associated with recommended learning content. A confidence level indicates a confidence in the keyword analysis performed by a learning content extension and/or a confidence in the learning content identified from a relevance model. There may be two different confidence levels: one in the keyword analysis and one in the identified learning content.

Confidence in the keyword analysis (whether performed by a learning content extension or by learning content distribution system 150) may be in a form of a score that is calculated using natural language processing (NLP). The scores may be calculated using a supervised machine learning process where each labeled training instance indicates (a) whether output of a keyword analysis is accurate or (b) how accurate (e.g., on a scale of 0 to 10) the output is.

Others ways to measure confidence in keyword analysis include:
  a. if an identified keyword appeared in sequential web pages that the user has recently viewed (e.g., if "cryptocurrency" was identified as a keyword in the last three web pages, then confidence in that keyword is relatively high
  b. if multiple keywords in the top N identified keywords have similar meanings (e.g., "bitcoin" and "cryptocurrency"), then confidence in these keywords is relatively high
  c. if a user clicked on a link that containing an identified keyword, then confidence in the keyword is relatively high (in this case, a recommended learning content item that is based on the keyword may be displayed on the linked-to web page (or through a different communication channel) even though the keyword was identified from the linking web page
  d. if multiple identified keywords matched the same learning content item, then confidence in those keywords is relatively high Another way to measure confidence in keyword analysis is user feedback surveys.

Another way to measure confidence is clustering similar websites together. Similar websites may be similar in terms of type or nature of content, structure of the content, etc. One reason to cluster similar websites together is because a recommendation may be more powerful for certain types of web sites and significantly weaker for web sites that do not have any related learning content at all (e.g., Amazon, eBay, etc.).

Confidence in a learning content item may be based on one or more factors, such as an average of ratings (or a median rating) provided by consumers of the learning content item, a rating of a provider of the learning content item, a popularity of the learning content item (e.g., a number of views of the learning content item or a number of unique viewers of the learning content item), and a recency popularity of the learning content item (e.g., a number of views or viewers of the learning content item in the last week or the last day). For example, the more popular a learning content item is, the higher the score for the learning content item. Similarly, the higher the user rating of a learning content item, the higher the score of the learning content item. Similarly, the higher the rating of a provider of a learning content item, the higher the score of the learning content item.

Confidence in a learning content item may be based on how often other users have selected the learning content item when the learning content item was presented through a learning content extension. Thus, each learning content item that is subject to being recommended to users of the learning content extension may have a user selection rate (or click-through rate (CTR)). The higher the user selection rate of a learning content item, the higher the confidence in the learning content item and the higher the score of the learning content item.

In an embodiment, confidence for a learning content item is represented as a predicted user selection rate or predicted CTR. A predicted user selection rate may be based on past user interactions with learning content (whether through learning content extensions or through a website affiliated with learning content distribution system 150). A machine-learned prediction model may be trained and used to score each learning content item. Example features of the model include actual or current user selection rate of a learning content item, actual or current user selection rate of the user whose online activity initiated a request from the corresponding learning content extension to learning content distribution system 150, a relevance score of the learning content item (e.g., generated by a relevance model), a user rating of the learning content item (e.g., based on multiple ratings of different users relative to the learning content item), a rating of a provider of the learning content item (e.g., based on multiple ratings of different users relative to learning content items of the provider), a popularity of the learning content item, attributes of the user, length in audio/video time of the learning content item, time since the last time the user engaged with learning content, time the user spent on the corresponding website, time since the most recent learning content recommendation was presented to the user, time since the user provided (positive/negative) feedback to a recommendation, and growth rate of overall engagement with the learning content item or the topic the user is viewing. For example, a trending hot learning content item (or topic) may have fewer total views than other learning content items (or topics of other learning content items), but the growth rate is higher.

In an embodiment, regardless of how a confidence score is generated or measured, a confidence score of a learning content item is used to determine how the learning content item is presented to a user via a learning content extension. For example, if the confidence score is over a first threshold, then the learning content extension prominently displays a visual indication of the learning content item immediately (e.g., at least displaying a title of the learning content item). If the confidence score is between a first threshold and a second threshold, then the learning content extension displays a less prominent visual indication (e.g., a small icon) indicating that one or more recommendations are available to view if the visual indication is selected. If the visual indication is selected, then the learning content extension displays a title of a learning content item (or multiple titles if multiple learning are recommended). If the confidence score is less than the second threshold, then the learning content extension does not display any visual indication. Instead, learning content distribution system 150 stores the recommended learning content in association with an online account of the user, which account is accessible to the user when the user visits a website with access to the online account. In a related embodiment, even if a recommendation of a learning content item is presented to the user through the learning content extension, the recommendation may be presented to the use again when the user visits the website.

Recommended Portion within a Learning Content Item

In an embodiment, a recommendation of a learning content item includes a specific time or portion within the learning content item. For example, if a user selects a learning content item that is displayed as a result of a learning content extension, then playback of the learning content item begins not at the very beginning (e.g., time 0:00), but at position within the learning content item, such as time 2:32. In this way, not only does a user receive a relevant (and potentially highly confident) recommendation, the user is able to view the potentially most relevant portion of the recommended learning content item.

A specific portion of a learning content item may be identified based on a comparison of a keyword (e.g., that a learning content extension identified) and a transcript that contains the keyword. Different portions of the transcript are associated with different times. The first place in the transcript that the keyword is mentioned may be used to identify a starting point for the learning content item. For example, if a keyword is found in a chapter heading of a learning content item and a user selects identification data of the learning content item (e.g., in a popup display generated by the learning content extension or in a window of the corresponding web browser), then playback of the learning content item begins at a time corresponding to the chapter heading. As another example, if a keyword is found in a sentence of a transcript of a learning content item and a user selects identification data of the learning content item, then playback of the learning content item begins at a time corresponding to the most recent chapter heading or section heading to which the sentence belongs, a time corresponding to the beginning of the paragraph to which the sentence belongs, or a time corresponding to the beginning of the sentence.

Learning Content Extension History

In an embodiment, the history of users of a learning content extension (or "extension users") is used to identify relevant learning content for users that visit a website affiliated with learning content distribution system 150. The more data about which learning content items are presented to and selected by extension users, the more accurate the recommendations to non-extension users. In other words, the relevance model and/or the confidence model may be refined to learn scores that feature weights and/or score thresholds that are associated with higher user selection rates.

Distributing a Learning Content Extension

A learning content extension may be distributed to different client devices using one or more techniques. For example, a user (registered or not) visits a website affiliated with learning content distribution system 150. The user may visit a homepage. A dismissible banner is displayed on the homepage that includes an invitation for the user to download the learning content extension. As another example, when a user registers with the website that is part of a learning platform that provides access to many learning content items, part of the onboarding flow includes an invitation to download the learning content extension. As another example, users who are interested in registering with the website may be sent an email that includes an invitation to download the learning content extension and may use the learning content extension to view learning content without charge for a limited time.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
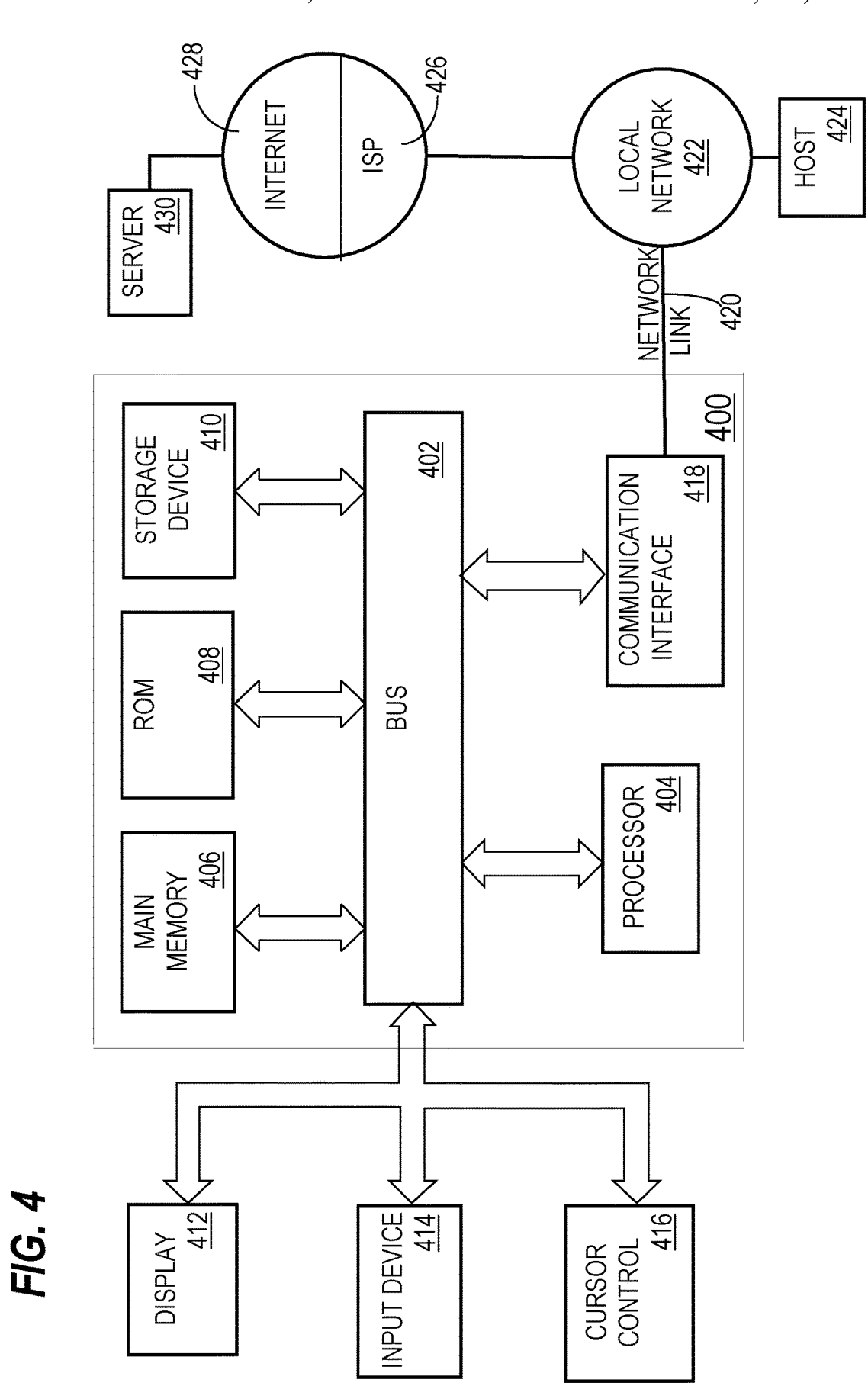
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   analyzing, by a browser extension, text within web content that is being displayed on a computing device;
   wherein analyzing the text involves identifying one or more keywords;
   transmitting, by the browser extension, over a computer network, to a remote system, the one or more keywords;
   for each keyword of the one or more keywords, identifying, by the remote system, one or more courses and one or more relevance scores, each of which reflects a relevance measure between said each keyword and a course of the one or more courses;
   wherein the web content is first web content that is from a first source determining, based on the first source, a first weight;
   wherein the one or more relevance scores are based on the first weight;

transmitting, by the remote system to the browser extension, course identification data that identifies one or more particular courses;

causing, by the browser extension, the course identification data to be displayed on the computing device;

analyzing, by the browser extension, second text within second web content that is being displayed on the computing device;

wherein the second web content is from a second source that is different than the first source;

wherein analyzing the second text involves identifying one or more second keywords;

transmitting, by the browser extension, over the computer network, to the remote system, the one or more second keywords;

determining, based on the second source, a second weight;

for each keyword of the one or more second keywords, identifying, by the remote system, one or more second courses and one or more second relevance scores;

wherein the one or more second relevance scores are based on the second weight;

transmitting, by the remote system to the browser extension, second course identification data that identifies one or more second courses;

causing, by the browser extension, the second course identification data to be displayed on the computing device.

2. The method of claim 1, wherein the web content is first web content, further comprising:

after causing the course identification data to be displayed on the computing device:

determining that second web content that is different than the first web content is being presented on the computing device;

determining, based on one or more past interactions of a user of the computing device, whether to present, on the computing device, additional course identification data related to the second web content;

determining to not present second course identification data related to the second web content.

3. The method of claim 1, further comprising:

identifying, by the remote system, a profile of a user of the computing device;

identifying, in the profile, one or more skills that are associated with the user;

identifying, by the remote system, the one or more particular courses based on the one or more skills.

4. The method of claim 1, wherein the one or more keywords are a plurality of keywords, further comprising:

making a determination, by the remote system, that a particular course is associated with multiple keywords of the plurality of keywords;

based on the determination, identifying the particular course as one of the one or more particular courses.

5. The method of claim 1, wherein the one or more keywords are a plurality of keywords that includes a first keyword and a second keyword, further comprising:

determining that the first keyword is in a first location within the web content;

based on the first location, associating the first keyword with a first weight;

determining that the second keyword is in a second location within the web content;

based on the second location, associating the second keyword with a second weight that is different than the first weight;

wherein a first relevance score for a first course is based on the first keyword and first weight;

wherein a second relevance score for a second course is based on the second keyword and the second weight.

6. The method of claim 1, further comprising:

determining, by the remote system, a confidence level for each course of a plurality of courses, wherein the confidence level for a particular course includes one or more of a user rating of the particular course, a rating of a provider of the particular course, a number of views of the particular course, or a user selection rate of the particular course;

identifying the one or more particular courses based on the confidence level determined for each course in the one or more particular courses.

7. The method of claim 1, further comprising:

determining, by the remote system, that a keyword of the one or more keywords is associated with a particular location, within a particular course of the one or more particular courses, that is not the beginning of the particular course;

wherein transmitting the course identification data comprises transmitting the particular location in association with the particular course;

after causing, by the browser extension, the course identification data to be displayed on the computing device, receiving user input that selects the particular course;

in response to receiving the user input, causing the particular course to be played back beginning at the particular location.

8. The method of claim 1, wherein:

the browser extension operates in one of a plurality of different modes;

each mode of the plurality of different modes dictates (a) which actions a user of the computing device can initiate or (b) which types of access the user has to courses that are listed on the computing device.

9. A method comprising:

analyzing, by a learning content extension executing within a web browser on a computing device, text within web content that the computing device receives from a third-party content provider;

wherein analyzing the text involves identifying one or more keywords;

transmitting, by the learning content extension, over a computer network, to a remote system, the one or more keywords;

for each keyword of the one or more keywords, identifying, by the remote system, one or more learning content items and one or more relevance scores, each of which reflects a relevance measure between said each keyword and a learning content item of the one or more learning content items;

selecting, from among a plurality of learning content items that were identified as a result of the one or more keywords and based on a score generated for each learning content item in the plurality, one or more particular learning content items;

determining, by the remote system, that a keyword of the one or more keywords is associated with a particular location, within a particular learning content item of the one or more particular learning content items, that is not the beginning of the particular learning content item;

transmitting, by the remote system to the learning content extension, identification data that identifies the one or more particular learning content items;

wherein transmitting the identification data comprises transmitting the particular location in association with the particular learning content item;

causing, by the learning content extension, the identification data to be displayed on the computing device;

after causing, by the learning content extension, the identification data to be displayed on the computing device, receiving user input that selects the particular learning content item;

in response to receiving the user input, causing the particular learning content item to be played back beginning at the particular location.

10. The method of claim 9, wherein the web content is first web content, further comprising:

after causing the identification data to be displayed on the computing device:

determining that second web content that is different than the first web content is being presented on the computing device;

determining, based on one or more past interactions of a user of the computing device, whether to present, on the computing device, additional identification data related to the second web content;

determining to not present second identification data related to the second content.

11. The method of claim 9, further comprising:

determining, by the remote system, a confidence level for each learning content item of a set of learning content items, wherein the confidence level for a particular learning content item includes one or more of a user rating of the particular learning content item, a rating of a provider of the particular learning content item, a number of views of the particular learning content item, or a user selection rate of the particular learning content item;

identifying the one or more particular learning content items based on the confidence level determined for each learning content item in the one or more particular learning content items.

12. Non-transitory storage media storing instructions which, when executed by one or more processors, cause:

analyzing, by a browser extension, text within web content that is being displayed on a computing device;

wherein analyzing the text involves identifying one or more keywords;

transmitting, by the browser extension, over a computer network, to a remote system, the one or more keywords;

for each keyword of the one or more keywords, identifying, by the remote system, one or more courses and one or more relevance scores, each of which reflects a relevance measure between said each keyword and a course of the one or more courses;

transmitting, by the remote system to the browser extension, course identification data that identifies one or more particular courses;

causing, by the browser extension, the course identification data to be displayed on the computing device;

wherein the browser extension operates in at least two modes of a plurality of different modes at different times on the computing device;

wherein each mode of the plurality of different modes dictates (a) which actions a user of the computing device can initiate or (b) which types of access the user has to courses that are listed on the computing device;

wherein the browser extension operates in a first mode of the plurality of modes at a first time when the user is not logged into or not subscribed to the remote system, wherein the first mode dictates a first set of action the user of the computing device can initiate during the first time period or a first type of access the user has to courses that are listed on the computing device during the first time period;

wherein the browser extension operates in a second mode of the plurality of modes at a second time, that is after the first time, when the user is logged into or is subscribed to the remote system, wherein the second mode dictates a second set of action the user of the computing device can initiate during a second time period or a second type of access the user has to courses that are listed on the computing device during the second time period;

wherein the first set of actions is different than the second set of actions and the first type of access is different than the second type of access;

determining, by the remote system, that a keyword of the one or more keywords is associated with a particular location, within a particular course of the one or more particular courses, that is not the beginning of the particular course;

wherein transmitting the course identification data comprises transmitting the particular location in association with the particular course;

after causing, by the browser extension, the course identification data to be displayed on the computing device, receiving user input that selects the particular course;

in response to receiving the user input, causing the particular course to be played back beginning at the particular location.

13. The non-transitory storage media of claim 12, wherein the web content is first web content, wherein the instructions, when executed by the one or more processors, further cause:

after causing the course identification data to be displayed on the computing device:

determining that second web content that is different than the first web content is being presented on the computing device;

determining, based on one or more past interactions of a user of the computing device, whether to present, on the computing device, additional course identification data related to the second web content;

determining to not present second course identification data related to the second content.

14. The non-transitory storage media of claim 12, wherein the one or more particular courses are video courses, wherein the instructions, when executed by the one or more processors, further cause:

identifying, by the remote system, a profile, of a user of the computing device, that is hosted by a networking system;

identifying, in the profile, one or more skills that are associated with the user;

identifying, by the remote system, the one or more particular courses based on the one or more skills.

15. The non-transitory storage media of claim 12, wherein the one or more keywords are a plurality of keywords, wherein the instructions, when executed by the one or more processors, further cause:

making a determination, by the remote system, that a particular course is associated with multiple keywords of the plurality of keywords;

based on the determination, identifying the particular course as one of the one or more particular courses.

16. The non-transitory storage media of claim 12, wherein the one or more keywords are a plurality of keywords that includes a first keyword and a second keyword, wherein the instructions, when executed by the one or more processors, further cause:
- determining that the first keyword is in a first location within the web content;
- based on the first location, associating the first keyword with a first weight;
- determining that the second keyword is in a second location within the web content;
- based on the second location, associating the second keyword with a second weight that is different than the first weight;
- wherein a first relevance score for a first course is based on the first keyword and first weight;
- wherein a second relevance score for a second course is based on the second keyword and the second weight.

17. The non-transitory storage media of claim 12, wherein the web content is first web content that is from a first source, wherein the instructions, when executed by the one or more processors, further cause:
- determining, based on the first source, a first weight;
- wherein the one or more relevance scores are based on the first weight;
- analyzing, by the browser extension, second text within second web content that is being displayed on the computing device;
- wherein the second web content is from a second source that is different than the first source;
- wherein analyzing the second text involves identifying one or more second keywords;
- transmitting, by the browser extension, over the computer network, to the remote system, the one or more second keywords;
- determining, based on the source, a second weight;
- for each keyword of the one or more second keywords, identifying, by the remote system, one or more second courses and one or more second relevance scores;
- wherein the one or more second relevance scores are based on the second weight;
- transmitting, by the remote system to the browser extension, second course identification data that identifies one or more second courses;
- causing, by the browser extension, the second course identification data to be displayed on the computing device.

18. The non-transitory storage media of claim 12, wherein the one or more particular courses are one or more particular video courses, wherein the instructions, when executed by the one or more processors, further cause:
- determining, by the remote system, a confidence level for each video course of a plurality of video courses, wherein the confidence level for a particular video course of the plurality of video courses includes one or more of a rating of a provider of the particular video course, a number of views by other users of the particular video course, or a user selection rate, of the particular video course, that is generated based on (1) a first plurality of users that selected the particular video course after being presented with certain course identification data that identified the particular video course and (2) a second plurality of users that did not select the particular video course after being presented with the certain course identification data;
- identifying the one or more particular video courses based on the confidence level determined for each video course in the one or more particular video courses.

19. The non-transitory storage media of claim 12, wherein the browser extension allows a user of the computing device to provide input that indicates two or more of: presenting the one or more particular courses immediately; saving the course identification data so that the user can view the one or more particular courses later; that the user is not interested in the one or more particular courses; or that the one or more particular courses are not relevant.

* * * * *